May 5, 1931.  A. J. WEATHERHEAD, JR  1,803,576
PIPE COUPLING
Filed April 13, 1927
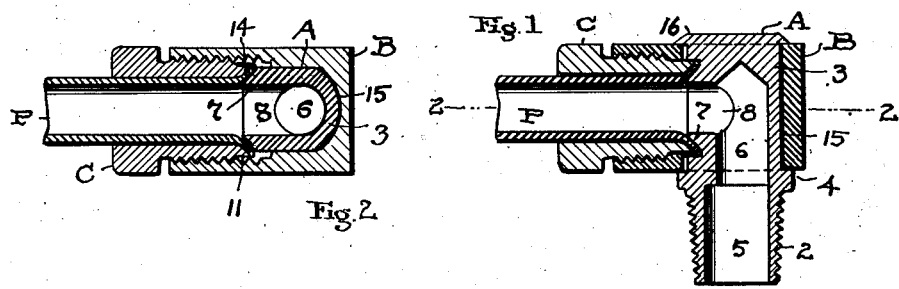
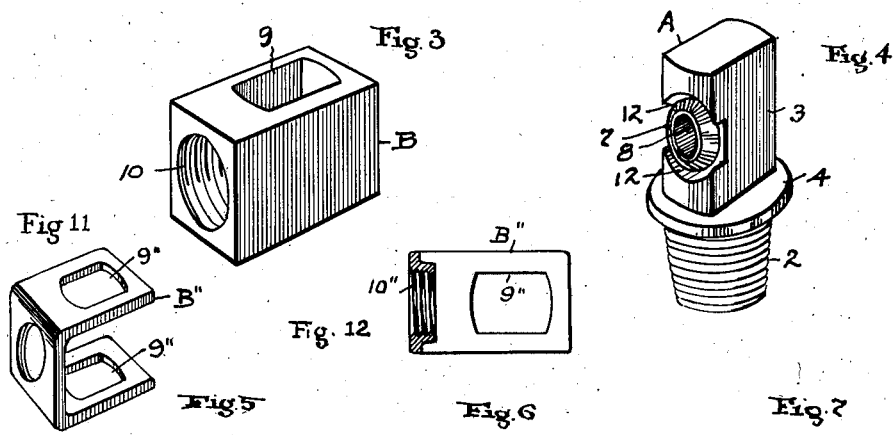
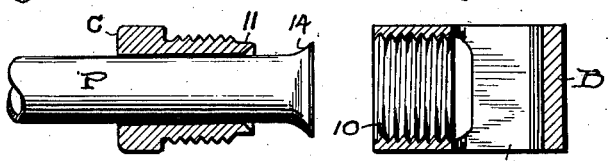
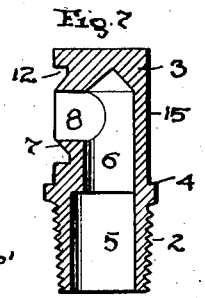
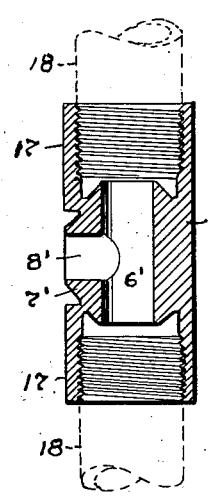
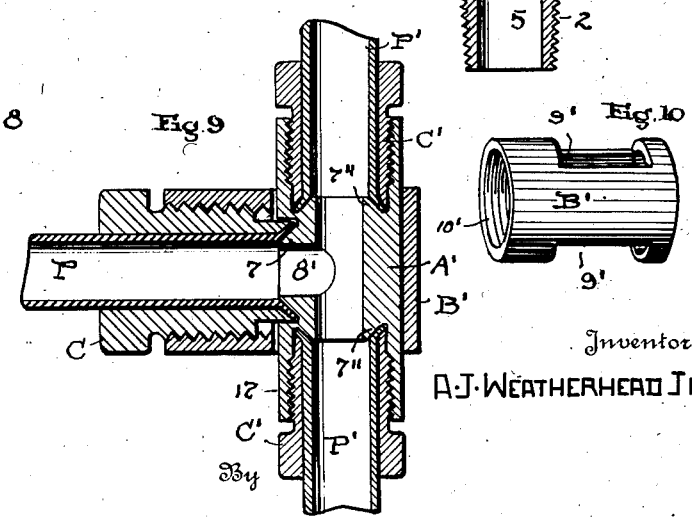
Inventor
A.J. WEATHERHEAD JR.

Patented May 5, 1931

1,803,576

UNITED STATES PATENT OFFICE

ALBERT J. WEATHERHEAD, JR., OF CLEVELAND, OHIO

PIPE COUPLING

Application filed April 13, 1927. Serial No. 183,372.

My invention relates to pipe couplings, and my primary object is to provide a coupling device made in sections or separate pieces, each of which may be produced cheaply and rapidly by automatic-screw-machine and punch press operations, and which sections or parts may be readily fitted and locked together in and by connecting a pipe thereto, and by such locking of the parts cause the joint or union with the pipe to be effectively sealed. As constructed, each section or part of the coupling device may be cut to a predetermined length from rod stock and accurately shaped to its desired form in an automatic screw-machine. The sections or parts may then be shipped separately and assembled at the place of coupling, or assembled together in the factory and shipped as a single coupling unit. The sectional construction of the coupling device also permits the manufacturer to produce and carry in stock variable forms of sections or parts of standard size, whereby different types of couplings may be made, such as angle couplings, single and double pipe couplings, T couplings and four-way pipe couplings, using the same sections or pieces in part and substituting modified sections or pieces in part, all made interchangeable and adapted to fit and interlock with each other and one or more pipes In the accompanying drawing, Fig. 1 is a sectional view of a pipe coupling of angular form constructed according to my invention; and Fig. 2 is a horizontal section thereof on line 2—2 of Fig. 1. Fig. 3 is a perspective view of the yoke member, and Fig. 4 a perspective view of the body member. Fig. 5 is a side view of a piece of tubing or pipe and a sectional view of a tubular nut sleeved over the pipe. Fig. 6 is a sectional view of the yoke member, and Fig. 7 a sectional view of the body member. Fig. 8 is a sectional view of a modified form of body member, and Fig. 9 is a sectional view of said modified body member clamped within a yoke member, such as delineated in Fig. 3, by means of a nut and pipe such as delineated in Fig. 5. Fig. 10 is a perspective view of a tubular form of yoke member. Figs. 11 and 12 are perspective and sectional views, respectively, of a yoke member stamped of strap or sheet metal.

One form of the invention exemplified in Figs. 1 to 7, inclusive, comprises an angular coupling or fitting adapted to connect a pipe P to a receptacle or other article or appliance from which a liquid or fluid is to be discharged or drained, or to which the liquid or fluid is to be supplied or delivered. This coupling or fitting consists of three parts or sections,—a body member A, a yoke member B, and a tubular nut C adapted to clamp the pipe and yoke upon body member A. Each section or part is made from a solid rod or other metal stock cut or stamped to the desired form by automatic screw-machine or punch press operations, and the sectional construction of this coupling or fitting facilitates manufacture thereof in that way with great accuracy and economy.

Body member A is cut to a given length and formed with a screw-threaded shank 2 at one end and a partly round and partly flat extension 3 at its opposite end. An annular shoulder or enlargement 4 may also be formed at the juncture of shank 2 and extension 3, if desired. A longitudinal passage 5 is drilled through shank 2, and a smaller bore 6 formed in extension 3 in off-center relation to passage 5 to permit a truncated cone 7 to be produced in one rounded side edge of flat extension 3. An opening 8 is drilled centrally through cone 7 at right angles to and in communication with bore 6, thus providing an angular fluid passage within the body.

Yoke member B is also cut to a given length from round stock, although it may be cut off tubular stock or stamped if desired, and a transverse passage or opening 9 is formed therein of approximately the same size and shape in cross section as the extension or main part 3 of body A so that said part 3 may be freely inserted within said opening and project more or less through one end thereof with yoke member B engaging shoulder 4. A round opening 10 is formed longitudinally at one end of yoke member B which communicates with passage 9, and the wall of this opening 10 is screw-threaded to receive the screw-threaded part of nut C. A straight tip portion 11 on nut C is adapted to enter the circular recess 12 surrounding cone 7 in body member A, and the mouth of this tip portion is flared to correspond with the angular side of the cone so that when the nut is sleeved upon pipe and the mouth end of the pipe is flanged or flared outwardly the said nut may be used to clamp the flaring flange 14 on the pipe against cone 4, thereby sealing the joint at opening 8 while at the same time locking yoke member B rigidly to body member A. Thus the pressure exerted by the nut in clamping the pipe flange against the cone draws the yoke tightly against body A at its curved edge 15, and the body and yoke being flat in part where sleeved together the yoke is held in straight alignment with opening 8 and prevented from turning or rotating upon the body. To release the pipe nut C may be unscrewed until separated from the yoke, and when the parts are released yoke B may be separated from body A, if desired. Where such separability of the yoke and body is not desired, the corner or edges 16 of the projecting end of extension 3 of body A may be peened or upset to overlap the yoke, as shown in Fig. 1.

A coupling device made of separate pieces as described permits an interchange and substitution of parts, whereby different types of coupling or fittings may be readily created. For example, various forms of body members may be substituted for body member A, and used with yoke B and nut C with the same sealing and locking effect. To illustrate this adaptability of the invention, and to exemplify one of many different assemblies which may be created, I show in Fig. 8 a modified form of body member A' having a central bore 6' and a right angled side opening 8' extending axially through a truncated cone 7', all of which find their counterparts in body member A, whereby a pipe may be attached at cone 7' in sealing union with body member A', using yoke B and nut C to clamp the parts together as hereinbefore described. However, body member A' differs from body member A in that its opposite ends 17—17 are of the same shape and diameter and open to bore 6' and in that each end 17 is internally screw-threaded to receive either screw-threaded pipes 18—18 as shown in dotted lines Fig. 8, or to receive tubular nuts C' and flanged pipes P' as shown in full lines in an assembled T unit in Fig. 9. The latter figure illustrates one form of coupling connection for a plural number of flanged pipes, body member A' being provided with, in this instance, additional cones 7" at opposite ends of bore 6' which extends through the central part of body member A'. Obviously by employing additional cones in the body, either at one or both ends of bore 6', it becomes feasible to clamp a flanged pipe or pipes P' to one or both ends of the body member as well as to clamp a pipe P to one side thereof. Accordingly, the invention is not necessarily limited to the specific form of fitting shown in Figs. 1 to 7, but is applicable to other forms of fittings and subject to considerable modification. Thus the yoke itself may be modified and made of tubular stock to provide a round tubular section B' having opposite openings 9' in its sides to receive a body member A or A', and also having a screw-threaded opening 10' longitudinally therethrough or at one end to receive a tubular nut C. Or flat stock may be used and pressed to provide a V-shaped yoke B" having its sides punched with openings 9" and its connecting end formed with a flanged screw-threaded opening 10", as shown in Figs. 11 and 12. For still other modified forms of the invention and different couplings of fittings, reference may be had to my other pending applications filed on even date herewith, namely Serial Nos. 183,373, 183,374, and 183,375.

What I claim, is:—

1. A pipe coupling, comprising a body having a conical sealing seat formed therein and a passage through said seat and body, a yoke member adapted to be sleeved upon said body, and a tubular nut angularly related to the sleeving axis of said body and yoke member and connected to said yoke member, in combination with a pipe having a flanged end engaged by said nut and adapted to be clamped against said conical seat to seal the joint and to clamp said yoke member and body together.

2. A pipe coupling, comprising a body having a passage therein, a yoke member having openings adapted to receive said body and formed with a screw-threaded opening angularly related to said openings for said body, and a tubular nut within said screw-threaded opening adapted to be sleeved upon a pipe having a flanged end and adapted to clamp said flanged end against said body with sealing effect at the joint and with locking effect upon said body and yoke member.

3. A pipe coupling, comprising a body having a passage therein and a conical seat at one side of said body open to said passage, a yoke having a transverse passage to receive said body and a screw-threaded opening at right angles to said passage to receive a nut, and a tubular nut entered within said screw-threaded opening of said yoke adapted to receive a pipe and to clamp the end of the pipe against said conical seat, thereby locking said yoke and body together.

4. A pipe coupling, comprising a body member and a yoke member constructed to be sleeved separably together and formed with communicating openings, said yoke member having a nut angularly screw-connected therewith with respect to the sleeving axis of said body member and said yoke and adapted to secure a pipe in sealing connection with said body member and in open communication with the opening in said body member, said members being separable for interchange and substitution of one of its parts whereby a different type of coupling may be created with the remaining parts.

5. A pipe coupling, comprising a body, a yoke member having two arms and a connecting wall, and a tubular nut screw-connected with said connecting wall, said parts being separably sleeved together to permit interchange and substitution of other forms of said body or yoke member whereby different types of couplings may be created substantially as described in each of which the body and yoke member are adapted to be locked together by clamping a pipe against said body by means of said nut.

6. A pipe coupling, comprising a body having a passage therein, a yoke member sleeved upon said body, one end of said body having a shoulder portion engaging said yoke and the other end of said body being peened to prevent separating of said yoke member and body, and means connected with and extending into said yoke adapted to secure the end of said pipe in communication with the passage in said body and to interlock said yoke and body.

7. A pipe coupling, comprising a body member having a passage therein, a second member sleeved over said member, and a nut extending through one wall of said second member and angularly related to and engaging said first member and adapted to clamp said members together, said nut being also adapted to clamp a pipe in sealing union with said body member and in open communication with said passage.

8. A pipe coupling, comprising a body, a yoke member, an opening through one wall of said yoke member angularly related to the axis of said body, and a tubular nut extending through said opening and adapted to couple a pipe to said body and clamp said yoke member and body together.

9. A pipe coupling, comprising two sleeved sections having angularly related communicating openings when assembled, including a single nut extending through one of said openings of said sections and adapted to clamp a pipe in sealing union with the other of said sections and to interlock said sections.

In testimony whereof I affix my signature.

ALBERT J. WEATHERHEAD, Jr.